United States Patent
Schumacher et al.

(10) Patent No.: US 6,250,057 B1
(45) Date of Patent: Jun. 26, 2001

(54) ASSEMBLY HAVING A MOWING FINGER AND A HOLDING-DOWN ELEMENT

(75) Inventors: Friedrich-Wilhelm Schumacher; Gustav Schumacher, both of Eichelhardt (DE)

(73) Assignee: Gebr. Schumacher Gerätebaugesellschaft GmbH, Eichelhardt (DE)

( * ) Notice: Subject to any disclaimer, the term of this patent is extended or adjusted under 35 U.S.C. 154(b) by 0 days.

(21) Appl. No.: 09/429,410

(22) Filed: Oct. 28, 1999

(30) Foreign Application Priority Data

Oct. 31, 1998 (DE) ................................. 198 50 261

(51) Int. Cl.⁷ .................................................. A01D 34/13
(52) U.S. Cl. ................................ 56/298; 56/307
(58) Field of Search ..................... 56/307, 308, 309, 56/310, 311, 312, 313, 298, DIG. 13

(56) References Cited

U.S. PATENT DOCUMENTS

| | | | | |
|---|---|---|---|---|
| 497,320 | * | 5/1893 | Hillabold | 56/301 |
| 888,491 | * | 5/1908 | Hampton | 56/298 |
| 1,085,349 | * | 1/1914 | Likely | 56/298 |
| 1,917,604 | * | 7/1933 | Scranton, Jr. | 56/298 |
| 2,080,471 | * | 5/1937 | Gillette et al. | 56/298 |
| 3,098,338 | * | 7/1963 | Myers | 56/296 |
| 3,284,994 | * | 11/1966 | Hamel | 56/298 |
| 3,401,512 | * | 9/1968 | Pool et al. | 56/298 |
| 3,401,513 | * | 9/1968 | Rickerd | 56/298 |
| 3,553,948 | * | 1/1971 | White | 56/307 |
| 4,286,425 | * | 9/1981 | Schumacher, II et al. | 56/307 |
| 4,520,618 | * | 6/1985 | Sorensen et al. | 56/310 |
| 4,530,204 | * | 7/1985 | Brooks | 56/298 |
| 4,651,511 | * | 3/1987 | Majkrzak | 56/310 |
| 4,750,321 | * | 6/1988 | Klein | 56/310 |
| 5,077,962 | * | 1/1992 | Schumacher, II et al. | 56/310 |
| 5,241,811 | * | 9/1993 | Bolinger | 56/310 |
| 5,456,071 | * | 10/1995 | Johnson | 56/308 |

FOREIGN PATENT DOCUMENTS 29 02 887 A1    8/1979  (DE).
296 13 925 U
           1   11/1996  (DE).

* cited by examiner

*Primary Examiner*—Robert E. Pezzuto
*Assistant Examiner*—Arpád Fáb Kovács
(74) *Attorney, Agent, or Firm*—Harness, Dickey & Pierce, P.L.C.

(57) ABSTRACT

An assembly has a mowing finger 1 with a bottom part 4, a top part 5 and a blade gap 8 between the two. The cutter 3 rests on a support 6 of the bottom part 4. The cutter 3 is arranged in the blade gap 8 and is able to move to and fro. A holding-down element 14 is form-fittingly held at the top part 5 in the direction of movement of the cutter 3. The top part 5 projects into an aperture in the holding-down element 14. Via its supporting portion 15, the holding-down element 14 is supported under pre-tension against the blade 7 and holds the blade 7 relative to the support 6. The rear attaching ends 10, 11 of the bottom part 4 and of the top part 5, as well as the fixing portion 16 of the holding down-element 14, are jointly secured to the back bar 2 by a fixing bolt 13. Accordingly, the fixing conditions are simplified. Further, by being form-fittingly held, the holding-down element 14 is securely prevented against displacement relative to the top part 5.

9 Claims, 2 Drawing Sheets

ASSEMBLY HAVING A MOWING FINGER AND A HOLDING-DOWN ELEMENT

CROSS-REFERENCE TO RELATED APPLICATION

This application is based upon and claims priority to German Patent Application 198 50 261.3 filed Oct. 31, 1998, which is herein expressly incorporated by reference.

BACKGROUND OF THE INVENTION

The invention relates to a mowing assembly having a mowing finger and a holding-down element. A plurality of mowing fingers and holding down-elements are arranged at the back bar and guide a mowing cutter which moves to and fro.

DE 29 02 887 A1 describes an assembly with a plurality of mowing fingers and holding-down elements distributed along the back bar. The holding-down elements have a pitch which corresponds to the integral multiple of the pitch of the mowing fingers. The holding-down elements are each associated with a mowing finger. The mowing bar fingers are each secured by a stud bolt to the back bar. The holding-down elements have a supporting portion which rests on the cutter. Also, the holding-down elements have an end portion which is angled relative to the supporting portion towards the back bar. The holding-down element is supported by the angled end on the back bar. At a distance therefrom, towards the supporting portion, a bore is provided to receive the stud bolt. A nut is threaded onto the projecting end of the stud to tension the holding-down element relative to the cutter. Two further apertures are at a distance from the stud bolt. Screw heads of hexagon socket screws pass through the apertures to fix the two directly adjoining mowing fingers. This prevents the holding-down element from pivoting to and fro while the cutter is moving to and fro. The holding-down element has to be sufficiently wide and heavy.

DE 296 13 925 U1 describes an assembly where a part of the mowing fingers is associated with the back bar with bolts which project into the blade gap. The bolts press into the cutter face by means of balls inserted into their end faces. The resulting point load leads to rapid wear at the balls and at the cutter surface.

SUMMARY OF THE INVENTION

It is an object of the invention to provide an assembly with a mowing finger and a holding-down element, where the holding-down element is of light-weight design. The hold-down element features little wear and is securely held against displacement caused by the forces acting on it as a result of the to-and fro-movements of the cutter.

In accordance with the invention, an assembly includes a mowing finger with a bottom part, a top part and a blade gap formed therebetween. The bottom part has a support for the blade of a cutter received in the blade gap. The rear attaching end of the bottom part and the rear attaching end of the top part include a fixing bolt. The fixing bolt jointly secures to a back bar. The bottom part and the top part are connected to one another at their front ends. The front ends are positioned in front of the blade gap. The holding-down element includes a rear fixing portion and a front supporting portion. A supporting face as well as holding means are form-fittingly held at the top part of the mowing finger in the two directions of movement of the cutter. The fixing portion serves to fix the holding-down element jointly with the bottom part and the top part of the mowing finger to the back bar. The supporting portion is arranged in the blade gap. The supporting portion supports, in a planar way, the blade to prevent the blade from escaping away from the support.

An advantage of this solution is that only a minimum amount of wear occurs as a result of the planar contact between the holding-down element and the cutter. Furthermore, since the holding-down element is held at the top part of the mowing finger in a form-fitting way and threaded fasteners are used to fix the mowing finger to the back bar, a light-weight holding-down element is provided. The holding-down element has a high degree of horizontal stability relative to the to- and fro-moving cutter. Thus, advantageous support is provided for the cutting forces of the cutter. This is especially advantageous if the material to be harvested is damp and difficult to cut.

According to a further embodiment of the invention, the supporting portion of the holding-down element is pre-tensioned to support the cutter. As a result, a constant supporting force is applied to the cutter when fixed to the back bar. However, as in a number of different applications, a permanently acting spring force pressing the holding-down element and thus the cutter against the support can be disadvantageous. However, it is possible in principle, not to provide a pre-tension, but to load the supporting portion of the holding-down element by a setting element which is held at the top part of the mowing finger. Thus, the supporting portion is adjustable relative to the support of the bottom part. To ensure that the holding-down element and the supporting portion return into their original position, the supporting portion, in the mounted condition, is pre-tensioned away from the support.

In a preferred embodiment, the setting element is a setting screw which engages a threaded bore in the top part. One advantage is that, as compared to the embodiment with permanent pre-tension, the upper side of the blade is not subjected to permanent pressure. The blade is merely prevented from escaping upwardly during the cutting operation. Any wear at the cutter or at the blades of the cutter and at the holding-down element can easily be compensated for by re-setting the setting screw. The setting screw is provided with a guard to prevent, during mowing, any harvested material from getting caught on the screw projecting from the top part of the finger. The guard has two arms arranged on either side of the setting screw.

A particularly advantageous embodiment includes webs to delimit a rectangular aperture in the holding-down element. The aperture is between the rear fixing portion and the front supporting portion. The webs connect the front supporting portion to the rear fixing portion. The webs form-fittingly hold the holding-down elements to prevent any lateral displacement of elements at the top part of the cutter. A portion of the length of the top part of the mowing finger projects form-fittingly into the aperture. The aperture is adapted to the width dimension of the top part in this region.

In a form-fitting condition, the fixing portion, in the mounted condition, rests on the rear attaching end of the top part of the mowing finger. Together with the rear attaching end and the bottom part, the fixing portion is secured to the back bar by one single connecting bolt. The back bar is accommodated between the top part and the bottom part.

From the following detailed description, taken in conjunction with the drawings and subjoined claims, other objects and advantages of the present invention will become apparent to those skilled in the art.

BRIEF DESCRIPTION OF THE DRAWINGS

Two embodiments of the inventive assembly are diagrammatically illustrated in the drawing and explained in greater detail with reference to the drawing where.

DETAILED DESCRIPTION OF THE PREFERRED EMBODIMENT

Figure 1:
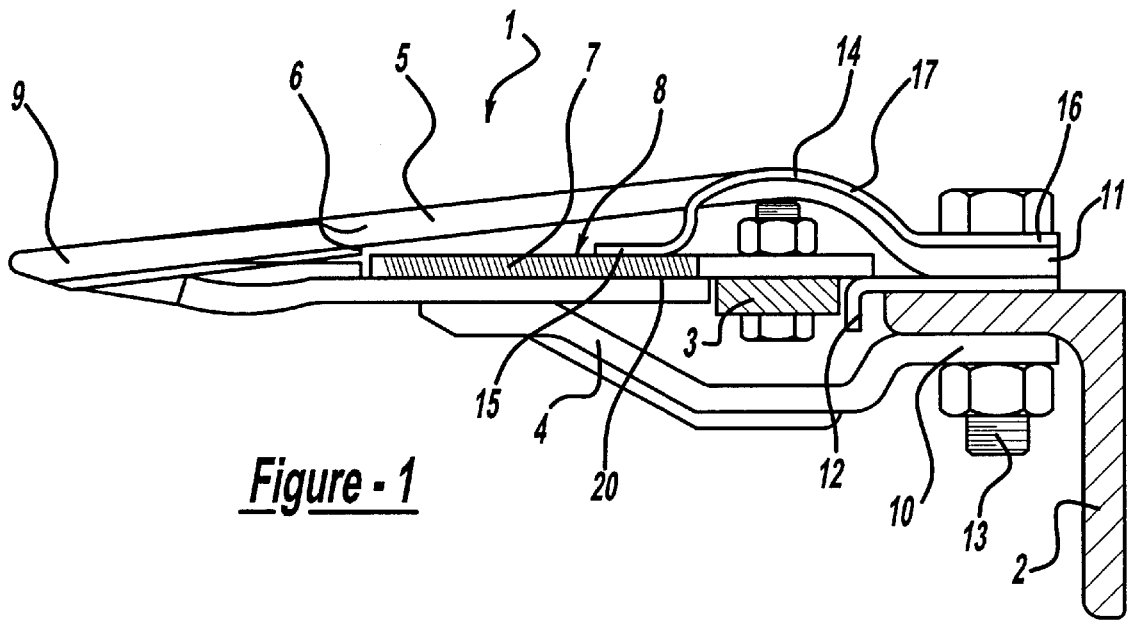
FIG. 1 is an elevation view partially in section of a first embodiment of the inventive assembly.

FIG. 1 shows a mowing finger 1 associated with a back bar 2. A cutter 3 with blades 7 moves to and fro, into and out of the drawing plane. The mowing finger 1 includes a bottom part 4 which is composed of two parts. A rear attaching end 10 is connected to the back bar 2. A second part includes the support 6 for the blades 7 of the cutter 3. Furthermore, the mowing finger 1 includes a top part 5. The top part 5, at its front end, is firmly connected to the bottom part 4. Thus, this forms the common front end 9. The rear attaching end 11 connects to the back bar 2. A blade gap 8 is formed between the bottom part 4 and the top part 5. The blade 7 is arranged in the gap 8.

The cutter 3 includes a bar which carries the individual blades 7. the blades are fixed to the cutter 3 by bolts. A guiding plate 12, together with the rear attaching end 10 of the bottom part 4 and the rear attaching end 11 of the top part 5, are secured to the back bar 2 by a fixing bolt 13. The mowing cutter 3 is laterally guided between the guiding plate 12 and the rear end of the part of the bottom part 4 including the support 6.

Figure 4:
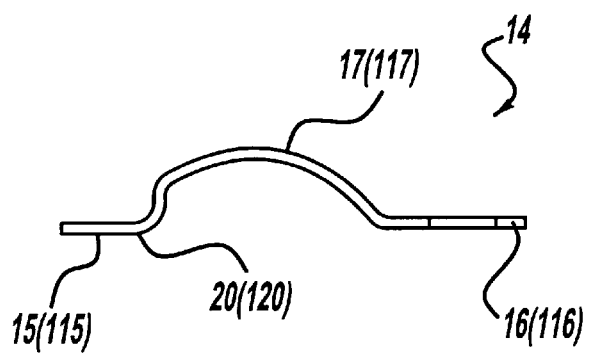
FIG. 4 is a side elevation view of a holding-down element.
Figure 5:
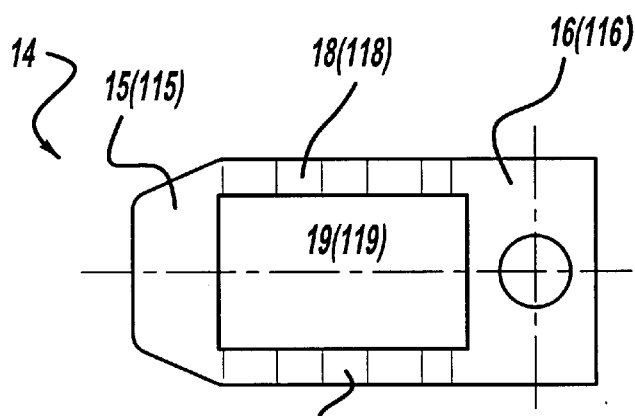
FIG. 5 is a top plan view of the holding-down element.

A holding-down element 14 is provided in order to prevent the blades 7 from being lifted off the support 6 if the material is very stalky. The holding-down element 14 has a rear fixing portion 16 and a front supporting portion 15. As can be seen in FIGS. 4 and 5, the holding-down element 14, in the region between the supporting portion 15 and the fixing portion 16, includes an arched portion with an aperture 19. The aperture 19 is laterally delimited by the two webs 17, 18. The webs 17, 18 connect the supporting portion 15 to the fixing portion 16. The supporting portion 15 and the fixing portion 16 extend parallel relative to one another. In the embodiment of the mowing finger according to FIG. 1, the supporting portion 15 and fixing portion 16 are offset relative to one another with respect to height. Thus, the supporting portion 15 generates a pre-tension, by means of its supporting face 20 holding the blade 7 with pre-tension relative to the support 6. The top part 5 of the mowing finger 1 engages the aperture 19 to laterally guide the holding-down element 14. Accordingly, the width of the aperture 19 between the inner faces of the webs 17 and 18 is substantially filled. The fixing portion 16 is provided with a bore. The position of the bore corresponds to corresponding bores in the rear attaching end 10 of the bottom part 4, the rear attaching end 11 of the top part 5 and to a through-bore in the guiding plate 12. Thus, the parts can be secured jointly to the back bar 2 by a single fixing bolt 13.

Since the holding-down element 14 is form-fittingly held at the top part 5 of the mowing finger 1, it is possible to prevent any lateral movement of the holding-down element 14, which may be caused by friction contact with the blades 7 during the to-and fro-movement of the cutter 3. The forces resulting from the friction contact with the cutter 3 are accommodated by the form-fitting connection. Such a holding-down element 14 may be of a spring steel. The pre-tension is such that during the period of service, a sufficiently high pressure force is applied to the blades 7 and the cutter 3, respectively.

Figure 2:
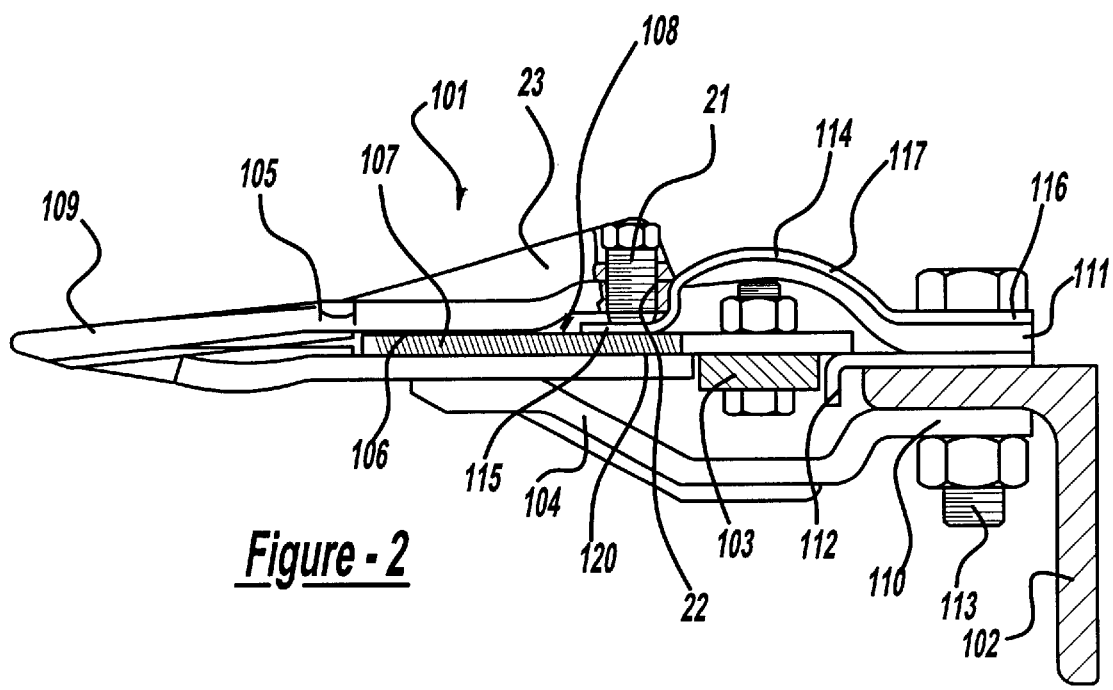
FIG. 2 is a view like FIG. 1 of a second embodiment.
Figure 3:
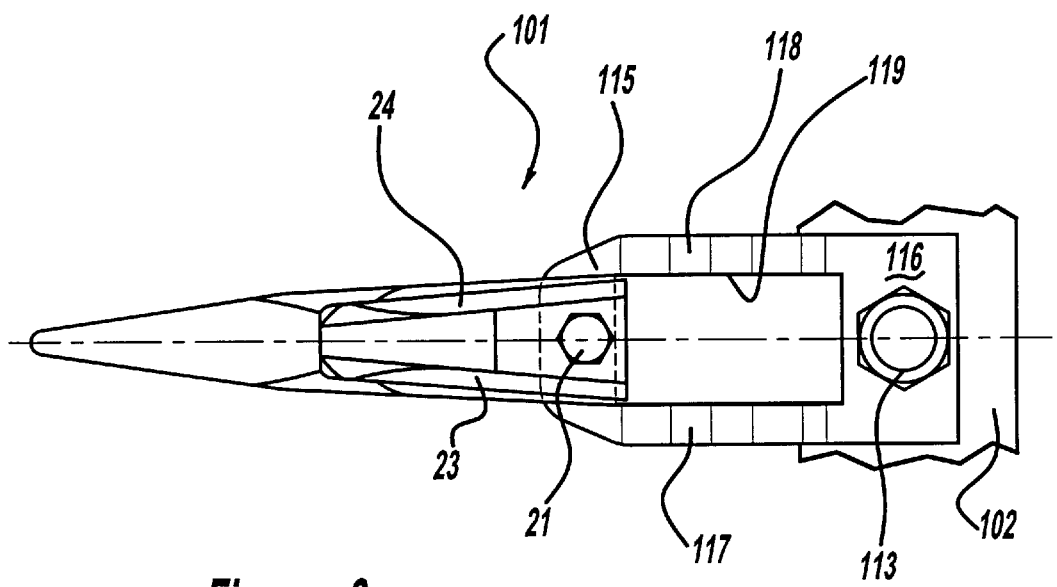
FIG. 3 is a plan view according to FIG. 2.

FIGS. 2 and 3 show an embodiment of a mowing finger 101 which is used in mowing machines which mow different types of harvested material. In these mowing machines, independently of the harvested material, it is desirable for the cutter 103 and the blades 107, respectively, to be pressed against the support 106 or not be pressed against the support, if the material to be harvested does not require the blades 107 to be pressed against the support 106. In FIGS. 2 and 3, any components comparable to those shown in FIG. 1 have been given reference numbers which are increased by 100 as compared to FIG. 1.

The differences relative to the embodiment shown in FIG. 1 will be described below. The holding-down element 114 shown in FIGS. 4 and 5 deviates from that shown in FIG. 1 in that it is pre-tensioned. Thus, the supporting portion 115 is not pressed against the blade, but lifted off of it. A setting screw 21 is provided to press the holding-down element 114, via its supporting portion 115, against the surface of the blade 107. The setting screw 21 engages a threaded bore 22 in the top part 105 of the mowing finger 101. Via its shank end, the setting screw 21 acts on the face of the supporting portion 115. The supporting portion faces away from the supporting face 120. Thus, depending on the direction in which the setting screw 21 is set, the supporting face 120 can approach or move away from the surface of the blade 107. The latter is the result of the pre-tension. Arms 23 and 24 are provided on either side of the setting screw 21. The arms 23, 24 prevent any stalky material from getting caught on the head of the setting screw 21. The head projects from the threaded bore 22. The arms 23, 24 project upwardly from the upper face of the top part 105. The head of the setting screw 21 is located between the arms 23, 24.

While the above detailed description describes the preferred embodiment of the present invention, the invention is susceptible to modification, variation and alteration without deviating from the scope and fair meaning of the subjoined claims.

What is claimed is:

1. An assembly comprising:

a mowing finger with a bottom part, a top part, and a blade gap between the bottom part and top part, said bottom part including a support for a blade of a cutter received in the blade gap;

a fixing bolt for jointly securing a rear attaching end of the bottom part and a rear attaching end of the top part to a back bar and said bottom part and top part being connected to one another at their front ends positioned in front of the blade gap;

a holding-down element including a rear fixing portion, and a front supporting portion comprising, a supporting face, and a holding member form-fittingly held at the top part of the mowing finger in the two directions of movement of the cutter, said fixing portion of the holding-down element serving to be jointly fixed with the bottom part and the top part of the mowing finger to the back bar and said supporting portion arranged in the blade gap for contacting and supporting, in a planar way, said cutter to prevent said cutter from escaping from the support.

2. An assembly according to claim 1, wherein said supporting portion of the holding-down element being pre-tensioned for supporting the cutter.

3. An assembly according to claim 1, wherein said supporting portion of the holding-down element is loaded by a setting element held at the top part of the mowing finger and said supporting portion being adjustable relative to the support of the bottom.

4. An assembly according to claim 3, wherein said supporting portion of the holding-down element is pre-tensioned away from the support.

5. An assembly according to claim 3, wherein said setting element being a setting screw which is located in a threaded bore of the top part.

6. An assembly according to claim 5, wherein said setting screw being associated with a guard which comprises two arms arranged on either side of the setting screw.

7. An assembly according to claim 1, wherein said holding member including webs which delimit a rectangular aperture in the holding-down element, said aperture being arranged between the rear fixing portion and the front supporting portion and said webs connecting the front supporting portion to the rear fixing portion and with the top part of the mowing finger, by one portion of its length, projecting into the aperture.

8. An assembly according to claim 7, wherein said fixing portion, in the mounted condition, rests on the rear attaching end of the top part of the mowing finger and, together with said rear attaching end and said bottom part, being secured by the fixing bolt to the back bar.

9. An assembly according to claim 1, wherein said holding-down element, together with the top part and the bottom part, being connected by the fixing bolt to the back bar.

* * * * *